United States Patent [19]

Gerber

[11] 4,393,596
[45] * Jul. 19, 1983

[54] REMOTELY ADJUSTABLE SIGHTING DEVICE FOR TRACTORS

[76] Inventor: B. Lynn Gerber, 6286 E. Catalina Dr., Scottsdale, Ariz. 85251

[*] Notice: The portion of the term of this patent subsequent to Jul. 28, 1998, has been disclaimed.

[21] Appl. No.: 204,454

[22] Filed: Nov. 6, 1980

Related U.S. Application Data

[63] Continuation-in-part of Ser. No. 99,526, Dec. 3, 1979, Pat. No. 4,280,281.

[51] Int. Cl.³ .............................................. G01C 15/00
[52] U.S. Cl. ................................... 33/264; 33/185 V; 33/392
[58] Field of Search .................. 33/185 V, 264, 161, 33/293, 338, 286, 275 R, 350, 344, 392

[56] References Cited

U.S. PATENT DOCUMENTS

| | | | |
|---|---|---|---|
| 1,373,852 | 4/1921 | Allen | 33/185 V |
| 2,483,011 | 9/1949 | Hudson | 33/185 V |
| 2,827,704 | 3/1958 | Hunsicker | 33/185 V X |
| 3,028,678 | 4/1962 | Bakehouse | 33/185 V |
| 3,654,653 | 4/1972 | Eggert et al. | 33/264 X |
| 3,932,028 | 1/1976 | Klingler | 33/264 |
| 3,943,635 | 3/1976 | Ito | 33/264 |
| 4,280,281 | 7/1981 | Gerber | 33/185 V |

FOREIGN PATENT DOCUMENTS

212610  12/1960  Austria ................................ 33/264

Primary Examiner—William D. Martin, Jr.
Attorney, Agent, or Firm—Cahill, Sutton & Thomas

[57] ABSTRACT

A sighting device for attachment to the hood of the tractor is remotely adjustable by a driver seated in a driver's seat of the tractor to enable him to visually align the tractor with a swath or furrow previously cut in a field by a towed farm implement so that a swath or furrow presently being cut by the farm implement is properly aligned with the previously cut swath or furrow. The sighting device includes a pair of opposed horizontal telescopic extension arms and a pair of pivot arms pivotally attached to respective outer ends of the extension arms. Each of the pivot arms is utilized as a sighting blade which is oriented so that, as seen by the eyes of the driver, the sighting blade is parallel to and aligned along the previously plowed furrow or the edge of the previously cut swath. The degree of extension of the horizontal extension arms and the degree of inclination of the pivot arms are independently controllable by means of a pair of momentary switches located near the driver's seat.

14 Claims, 28 Drawing Figures

REMOTELY ADJUSTABLE SIGHTING DEVICE FOR TRACTORS

RELATED APPLICATIONS

This is a continuation-in-part application of my co-pending application entitled "REMOTELY ADJUSTABLE SIGHTING DEVICE FOR TRACTORS", Ser. No. 099,526, filed Dec. 3, 1979, now U.S. Pat. No. 4,280,281, issued July 28, 1981.

BACKGROUND OF THE INVENTION

1. Field of the Invention

The invention relates to sighting devices for use on a tractor to enable a tractor driver to visually align the direction of movement of the tractor with previously cut swaths or furrows in a field, and particularly to sighting devices which are remotely adjustable by the driver while he is seated in the driver's seat of the tractor.

2. Description of the Prior Art

A variety of sighting devices have been utilized for attachment to tractors or farm implements towed by tractors to enable drivers seated in the driver's seats of the tractors to visually align the tractors with previously cut swaths or furrows dug into the ground by the towed farming implements. The sighting devices must be adjusted so that the tractors are oriented to pull the farming implements so that the farming implements cut swaths or furrows which are adjacent to and perfectly aligned with previously cut swaths or furrows when the sighting devices are in line with points in straight lines between the eyes of the drivers and edges of previously cut swaths or furrows. The state of the art for sighting devices, especially those for use in conjunction with tractors and farm implements, is believed to be accurately represented by U.S. Pat. Nos. 3,028,678; 2,827,704; 2,538,112; 2,559,761; 2,548,226; 3,932,028; and 4,034,480. None of the sighting devices disclosed in the above patents is adjustable by a person seated in the driver's seat of a tractor. Consequently, the sighting devices must be adjusted in a trial-and-error manner wherein the tractor driver dismounts from the driver's seat, adjusts the sighting device to an initial setting, remounts the tractor, and drives the tractor for a distance to see if the swath or furrow being cut by the towed farm implement is accurately aligned with the previously cut swath or furrow. Since it is very important that the swath or furrow cut by the towed implement be properly aligned with previously cut swaths or furrows, the above mentioned trial-and-error adjustment method may necessitate an unduly large number of trial settings before satisfactory adjustment of any of the prior sighting devices is achieved.

Accordingly, it is an object of the invention to provide a sighting device for use in conjunction with tractors towing agricultural implements, which sighting device avoids the necessity of the driver dismounting from the driver's seat in order to adjust the sighting device.

It is another object of the invention to provide a sighting device which avoids the necessity of a second person adjusting the sighting device in accordance with instructions from a driver seated in the driver's seat of the tractor.

Some of the previous sighting devices are attached to the farm implement being towed, rather than to the tractor. This approach to providing sighting devices requires a separate sighting device for each farm implement. Since the sighting devices are quite expensive, this approach is undesirable.

Accordingly, another object of the invention is to provide an adjustable sighting device which avoids the necessity of trial-and-error sighting methods which require dismounting of the tractor driver or assistance of a second person, which sighting devices are attached to a tractor rather than to a farm implement.

Another object of the invention is to provide a sighting device for attachment to a tractor, which sighting device is conveniently and continuously adjustable by a person seated in the driver's seat of the tractor.

Another object of the invention is to provide a low-cost sighting device which is adjustable from the driver's seat of the tractor.

Another object of the invention is to provide a sighting device in conjunction with tractors towing farm implements, which sighting device overcomes the shortcomings of the sighting devices of the prior art.

Another object of the invention is to provide a sighting device which is easily adjustable from the seat of a tractor and which maintains a correct sighting despite obrupt jolting of the tractor as it moves over irregular ground.

SUMMARY OF THE INVENTION

Briefly described, and in accordance with one embodiment thereof, the invention provides a remotely adjustable sighting device for attachment to an engine hood of a tractor to enable a driver seated in the driver's seat of the tractor to visually align the direction of travel of the tractor so that a towed farm implement cuts a swath or furrow in proper alignment with previously cut swaths or furrows. In the described embodiment of the invention, the sighting device includes two opposed telescoping extension arms for extending outwardly through variable distances from a point of the tractor on which the sighting apparatus is attached to the hood of the tractor. Each telescoping extension arm includes a fixed outer tube and an inner tube slidably disposed within the outer tube. A nut block is attached to one end of the inner tube. A drive screw extends through the nut block, and is turned by means of a drive mechanism remotely controlled by the driver as he is seated in the seat of the tractor. Pivot arms, each serving as a sighting blade, are pivotally attached to the outer ends of the respective inner tubes. Each pivot arm is controlled by means of an assembly including a drive screw connected by means of a clevis to a lower end of a pivot arm, a nut block through which the drive screw extends, the nut block being attached in fixed relationship to the inner tube on which the pivot arm is attached, and a flexible drive cable driven by the drive mechanism. The drive mechanism includes a DC motor, a pair of electromagnetic clutches coupled, respectively, by means of pulleys and drive belts to first and second rotating shafts. The first rotating shaft is connected to the drive screws passing through the nut block attached to the inner tubes, the second rotating shaft being attached to the flexible cables. A tractor battery is controllably coupled to cause the DC motor to operate in either the forward or reverse direction in response to each of a first momentary switch and a second momentary switch actuated by the seated driver. The battery is also controllably coupled to one or the other of the electromagnetic clutches in response to the actuation of the first and second momentary switches, respectively. A first and second electromagnetic breaking devices are coupled to first and second ones of the electromagnetic clutches, respectively, for preventing undesired rotation of the first and second shafts, and are energized in response to the first and second momentary switches, respectively, to disengage the electromagnetic breaking devices when the first and second electromagnetic clutches are respectively engaged. In use, the driver deploys the momentary switches, while seated in the driver's seat, to extend the extension arms and to pivot the pivot arms so that the driver sees the pivot arms aligned along and parallel to the previously cut furrows. In one embodiment of the invention, two bevel gear assemblies coupled by means of two flexible cables to first and second hand cranks located immediately adjacent to the driver's seat are utilized to rotate the first and second shafts. The driver thus turns the first and second cranks to adjust the extension arms and the pivot arms, respectively, while he is seated in the driver's seat. In one embodiment of the invention, the telescoping extension arms each comprise a rack gear which is moved inwardly and outwardly from a housing by means of a pinion gear mounted within the housing. The pinion gear is attached to one of the flexible cables and is rotated by means of one of the cranks. The housing is pivotally attached to the front of the tractor. A damping means is attached to the housing, so that when the tractor undergoes tilting or jolting as it moves over irregular ground, the housing pivots to maintain its orientation despite the jolting of the tractor. Damping means are provided to dampened oscillatory pivoting of the housing relative to the tractor. In one embodiment of the invention, a heavy pendulum weight is connected to and suspended beneath the housing to maintain the housing the telescoping arms level. Friction surfaces contact the surface of the pendulum weight to effect damping of movement of the pendulum weight as the housing pivots.

DESCRIPTION OF THE INVENTION

Figure 1:
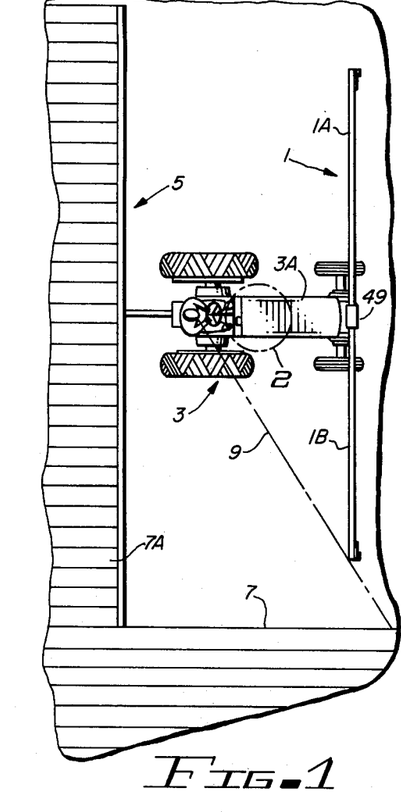
FIG. 1 is a top view of a tractor towing an implement, the sighting device of the invention being mounted on the hood of the tractor and adjusted to enable the tractor driver to align the tractor with a previously cut swath or furrow.

Referring now to FIG. 1, sighting apparatus 1, which includes two opposed horizontal extension arms 1A and 1B, each extending outwardly from a center housing 49, are mounted on hood 3A of tractor 3. Tractor 3 pulls a farming implement 5 in a forward direction. Farming implement 5 cuts a swath or group of furrows 7A as it is pulled forward through the field.

The purpose of sighting device 1 is to enable the driver of tractor 3 to keep tractor 3 oriented so that its direction of travel is parallel to the edge of previously plowed furrows 7, so that farming implement 5 cuts furrows 7A precisely parallel to furrows 7.

In order to accomplish this, the tractor driver 3 adjusts the outward extension of horizontal extension arm 1B until the outer edge 19A of pivot arm 17A (see FIG. 6, subsequently described) is aligned with the tractor driver's eye along the edge of furrows 7.

Figures 5, 8, 12:
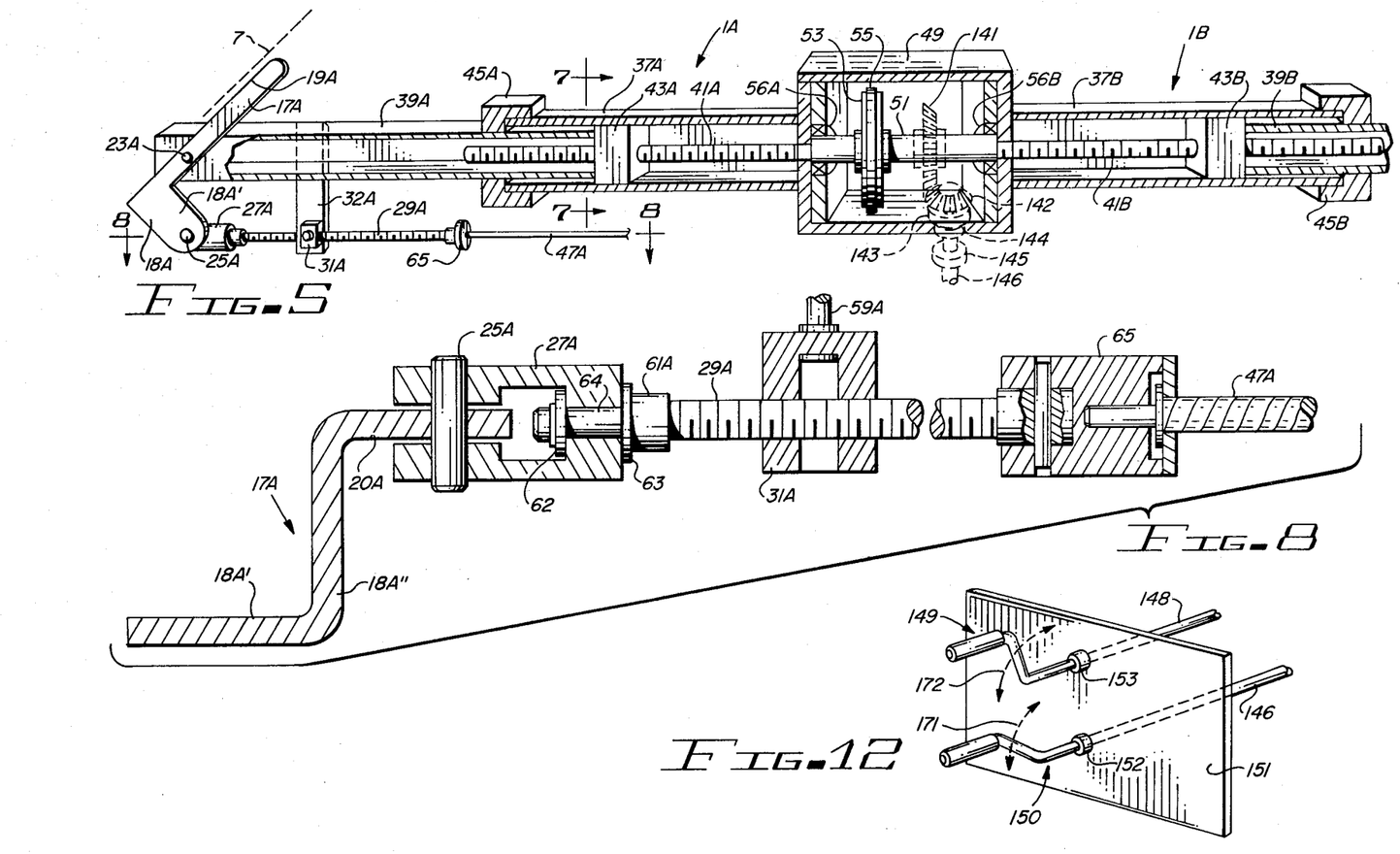
FIG. 5 is a partial sectional side view of the sighting device shown in FIG. 1.
FIG. 8 is a partial section view taken along section line 8—8 of FIG. 5.
FIG. 12 is a perspective view of part of an alternate manual drive system replacing the motor and pulley system shown in FIGS. 3, 4, 5, and 9.
Figure 9:
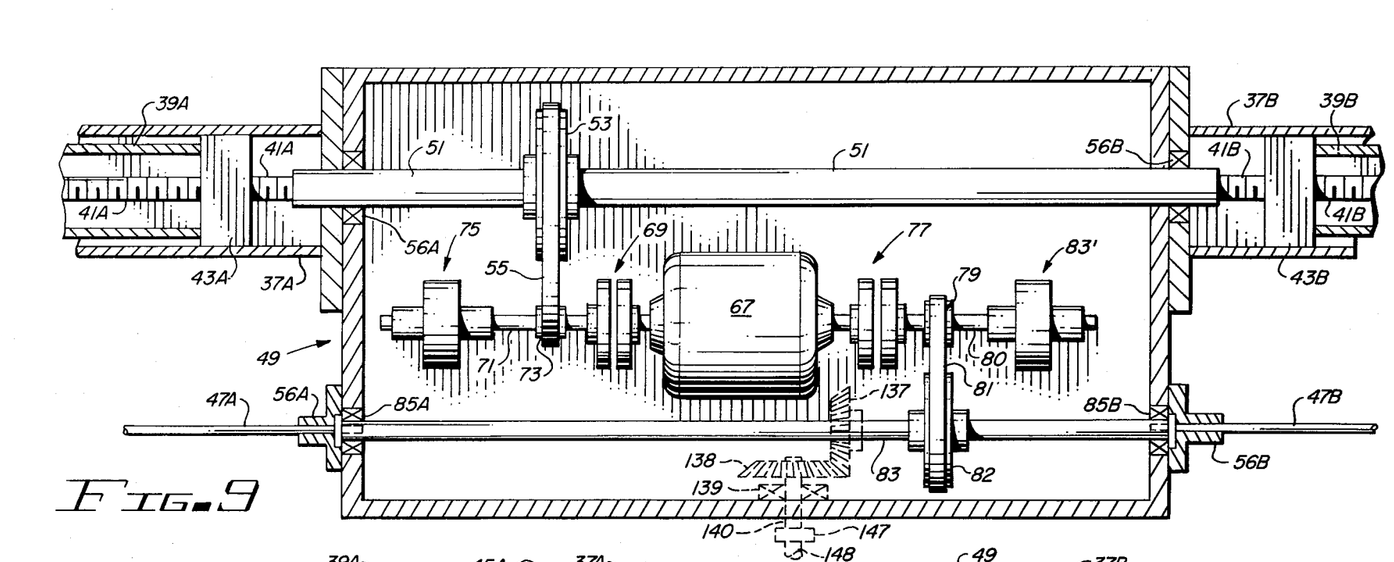
FIG. 9 is a partial sectional top view of the sighting device of FIG. 5.

The structure and operation of sighting device 1 can be best understood by referring to FIGS. 5 and 9. Referring first to FIG. 5 (which is a partial sectional side view of sighting device 1 taken from the tractor driver's side of the device when it is mounted on the hood 3A of tractor 3), extension arms 1A and 1B extend horizontally outward from the sides of housing 49. As subsequently explained, housing 49 contains an electric motor, several clutches, pulleys, and belts and is attached rigidly to hood 3A of tractor 3.

In FIGS. 5 and 9, each of the reference numerals designating parts of left extension arm 1A includes the letter "A", while reference numerals including a "B"

are used to designate corresponding parts of right extension arm 1B.

Figure 7:
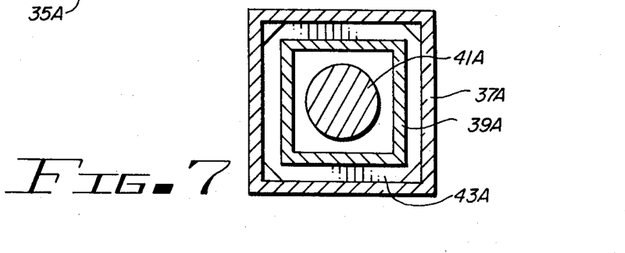
FIG. 7 is a section view taken along section line 7—7 of FIG. 5.

As indicated by FIG. 7, taken along section lines 7—7 of FIG. 5, a pair of telescopic square tubes 37A and 39A are included in extension arm 1A. Outer tube 37A is rigidly attached to the left vertical side of housing 49. Inner tube 39A extends into the open end of outer tube 37A through a closely fitting guide cap 45A. Guide cap 45A maintains square tube 39A in proper parallel relationship to outer tube 37A, and also prevents dirt and dust from entering into tube 37A.

A nut block 43A is attached to the right end of inner tube 39A and slides along the inner surfaces of outer tube 37A. Driver screw 41A extends through nut block 43A, and is attached to axel 51, which is mounted within housing 49 by means of a pair of bearings 56A and 56B. But block 43A moves to the right or left as screw shaft 41A turns clockwise or counterclockwise, causing inner arm 39A to be extended or retracted.

Right extension arm 1B, which includes outer tube 37B, inner tube 39B, nut block 43B and drive screw 41B is entirely similar in structure and operation to left arm 1A, and therefore will not be described herein in detail.

A pivot arm 17A, which is vertical in one plane, is pivotally attached by means of pivot pin 23A to the left end of inner tube 39A. Pivot arm 17A is utilized as a sighting blade, outer edge 19A of which is aligned along previously cut swath 7 as seen by the seated driver along sighting line 9 (FIG. 1). Typically, pivot arm 17A will be adjusted to an angle which is roughly 45 degrees with respect to extension arm 1A. The angle depends, of course, on the height of the driver's eye above the ground, the width of the farm implement being towed, the location of the mounting of sighting apparatus on the hood of the tractor, and the amount of extension of extension arm 1A.

The lower end 18A of pivot arm 17A is pivotally connected by means of pivot pin 25A to clevis 27A. Clevis 27A is connected to drive screw 29A. Drive screw 29A is connected by means of coupler 65A to a flexible drive cable 47A.

Drive screw 29A passes through nut block 31A, which is pivotally connected to bracket 32A. Bracket 32A is rigidly attached to inner tube 39A.

Figure 6:
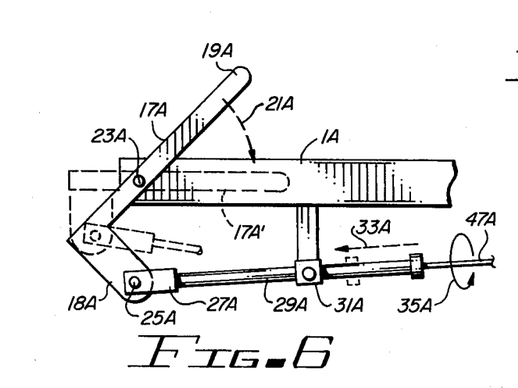
FIG. 6 is a partial side view useful in describing the operation of the pivot arm of the sighting device shown in FIG. 5.

As can be easily seen by referring to FIG. 6, as flexible cable 49A turns drive screw 29A in the direction indicated by arrow 35A, drive screw 29A moves in the direction indicated by arrow 33A along stationary nut block 31A. This causes clevis 27A to move to the left, causing pivot arm 17A to pivot in the direction indicated by arrow 21A. As indicated by dotted line 17A' in FIG. 6, the position of pivot arm 17A can be varied to suit the needs of the user.

A more detailed top view of the above pivot arm assembly is shown in FIG. 8, which is taken along section lines 8—8 of FIG. 5. Referring now to FIG. 8, pivot arm 17 includes vertical portion 18A' and a horizontal section 18A" which is perpendicular to section 18A'. The lower end section 20A' is perpendicular to section 18A", and extends into clevis 27A. Pivot pin 25A extends into a hole in section 20A and holes in clevis 27A, allowing pivot arm 17A to pivot about pivot pin 25A.

Drive screw 29A is attached by means of a coupler including end section 61A, bearing rod 64, and end section 62. End section 61A is rigidly attached to the left end of drive screw 29A. Bearing rod 64 turns rotatably in a hole in the end of clevis 27A, and is rigidly attached to end section 62. Thus, as drive screw 29A moves right and left, clevis 27A is forced to move right or left but is not caused to rotate with drive screw 29A.

Nut block 31A, through which drive screw 29A extends, its threads being mated to threads in nut block 31A, is pivotally mounted by means of pivot pin 59A to rigid bracket 32A.

Flexible cable 49A is attached by means of coupler 65 to the right end of drive screw 29A, so that cable 47A translates its rotary motion to drive screw 29A.

A pivot arm 17B, not shown, is mounted on the extreme right end of right extension arm 1B, and is controlled in an entirely similar manner.

Referring now to FIG. 9, which is a sectional top view of the structure shown in FIG. 5, a reversible DC motor 67 is rigidly mounted in housing 49. DC motor 67 has a drive shaft which extends through both ends of DC motor 67. The left end of the drive shaft of motor 67 is coupled to one plate of an electromagnetic clutch 69, the other plate of which is attached to a rotatable shaft 71. Similarly, the right end of the drive shaft of DC motor 67 is rigidly attached to one plate of a second electromagnetic clutch 77, the other plate of which is attached to rotatable shaft 80.

Pulley 73 is rigidly attached to rotatable shaft 71. A larger pulley 63 is rigidly attached to rotatable shaft 51, which, as previously explained, is rigidly attached to the inner ends of drive screws 41A and 41B, to effect extension and retraction of inner tubes 39A and 39B of extension arms 1A and 1B, respectively.

Thus, it is seen that when electromagnetic clutch 69 and DC motor 67 are both energized, belt 55 translates rotational motion from electromagnetic clutch 69 and shaft 71 to shaft 51 and drive screws 41A and 41B.

An electromagnetic brake device 75 is also attached to rotatable shaft 71. Electromagnetic brake device 75 is engaged to produce braking action on shaft 71 when electromagnetic shaft 75 is not energized, thereby preventing undesirable rotation of rotatable shaft 71. Whenever electromagnetic clutch 69 is energized, electromagnetic brake device 75 is also energized, whereby electromagnetic brake 75 becomes disengaged at the same time that electromagnetic clutch 69 becomes engaged. Electromagnetic brake device 83, which can be identical to electromagnetic brake device 75, is attached to rotatable shaft 80.

Figure 2:
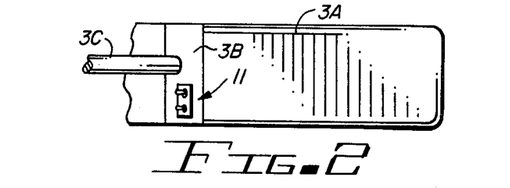
FIG. 2 is an enlarged view of detail 2 of FIG. 1.
Figure 4:
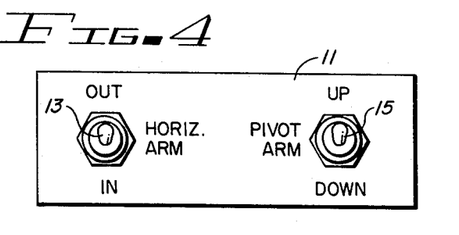
FIG. 4 is an enlarged view of a control panel shown in FIG. 2.

Referring now to FIGS. 2 and 4, it is seen that a control panel 11 is mounted on dashboard 3B of tractor 3, which control panel is located very close to the steering column 3C on which the steering wheel is mounted. Control panel 11 is located sufficiently close to the tractor driver that he can activate two momentary switches 13 and 15 without altering his driving position, thereby enabling him to move extension arm 1B (or 1A) and pivot arm 17A (or 17B) to adjust sighting device 1 so that outer edge 19A of pivot arm 17A appears parallel to and aligned along the edge of previously cut swath 7 to the eye of the seated driver as he views pivot arm 17A along line of sight 9. Thus, tractor 3 pulls farming implement 5 so that furrows 7A are in perfect alignment with an in proper spaced relation to furrows 7.

As indicated in FIG. 4, momentary switch 13 is normally in a centered or neutral position. Momentary switch 13 can be pushed or deflected upward, causing extension arms 1A and 1B to be extended outwardly. As soon as the operator releases momentary switch 13, it returns to its center or neutral position. When the operator deflects momentary switch 13 downward, it causes DC motor 67 to turn in the opposite direction, causing threaded screws 41A and 41B to retract extension arms 1A and 1B.

Referring agian to FIG. 9, it is seen that pulley 79 engages rotatable shaft 80. Pulley 79 is coupled by means of drive belt 81 to pulley 82. Pulley 82 is mounted on rotatable shaft 83, which is supported in housing 49 by means of bearings 85A and 85B. Flexible shafts 47A and 47B (which, as previously explained, are coupled to the pivot arm assemblies 17A and 17B) are connected by means of collars 56A and 56B to the opposite ends of rotatable shaft 89. When electromagnetic clutch 77 is energized, rotation of the drive shaft of DC motor 67 is translated to rotatable shaft 80 and flexible cables 47A and 47B, causing pivot arms 17A and 17B to be pivoted.

Thus, it is seen that lateral extension of extension arms 1A and 1B and the position of pivot arms 17A and 17B can be independently controlled, depending upon which of electromagnetic clutches 69 and 77 are engaged.

Referring back to FIG. 4, momentary switch 15 is deployed by the tractor driver to pivot pivot arm 17A in precisely the same manner that momentary switch 13 is deployed to extend or retract extension arms 1A and 1B, as previously explained.

Figure 10:
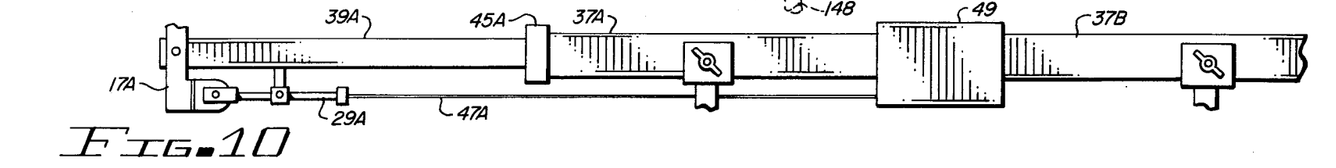
FIG. 10 is a partial side view useful in explaining the operation of the sighting device of FIG. 5.
Figure 11:
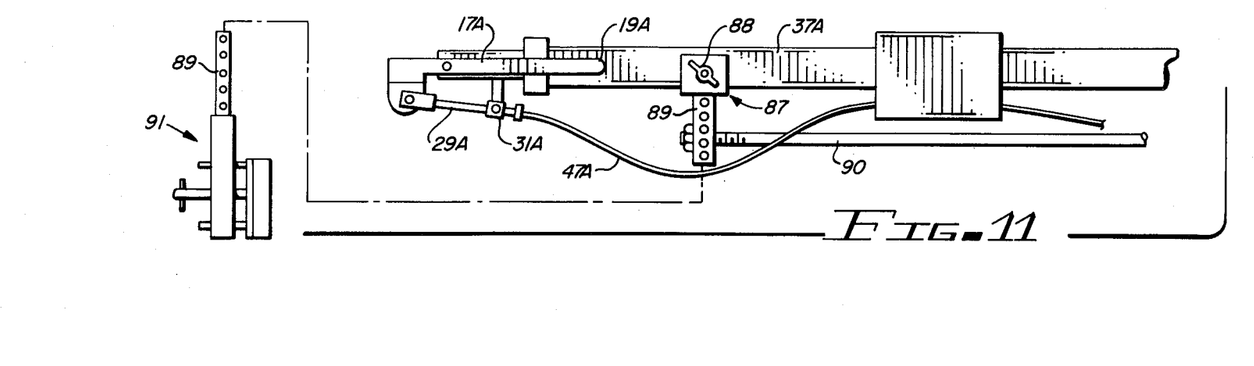
FIG. 11 is another partial side view useful in illustrating the operation of the sighting device of FIG. 1.

FIGS. 10 and 11 disclose how flexible cable 47A bends to accommodate extension and retraction of inner arm 39A and pivoting of pivoting arm 17A. A bracket 89 is rigidly attached to a clamp bracket 87 some of which is in turn attached by means of lower screw 88 to other tub 37A. A lower clamp assembly 91 is removably attached to the sides of hood 3A of tractor 3.

Figure 3:
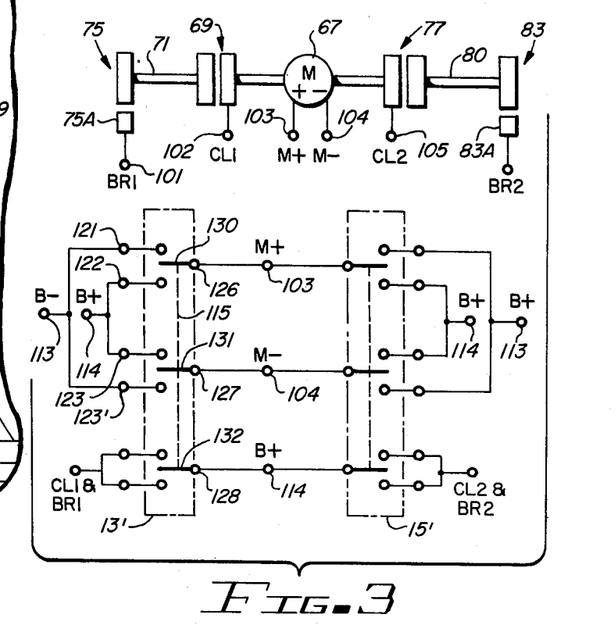
FIG. 3 is a partial schematic diagram of a drive system utilized in conjunction with the sighting device shown in FIG. 1.

Referring now to FIG. 3, a schematic diagram is shown illustrating the electrical coupling between reversible DC motor 67, clutches 69 and 77, and electromagnetic brakes 75 and 83' to momentary switches 13 and 15 of FIGS. 3 and 4.

Referring now to FIG. 3, motor 67 has a positive terminal 103 and a negative terminal 104, designated by M+ and M−, respectively. Electromagnetic clutches 69 and 77 have energization terminals 103 and 105, designated, respectively by CL1 and CL2. Electromagnetic brakes 75 and 83' have brake pads 75A and 83A which are normally engaged. When a positive voltage is applied to energization terminals 101 and 106, designated BR1 and BR2, respectively, brake pads 75A and 83A are disengaged from brake drums which are attached to rotatable shafts 71 and 80.

Motor 67 rotates in one direction when a positive DC voltage is applied between the M+ and M− terminals. The direction of rotation is reversed if the polarity applied voltage is reversed.

Electromagnetic clutches 69 and 77 have plates which are engaged when a positive voltage is applied to energization terminals CL1 and CL2.

Momentary switch 13 can be implemented by means of a switch assembly 13', which includes three ganged single pole double throw switches. The first switch includes terminal 126, which is connected to the M+ motor terminal and to wiper 30. Wiper 30 is spring biased to rest in a neutral position between terminals 121 and 122, which are connected, respectively, to negative battery terminal B− and positive battery terminal B+, also designated by reference numerals 115 and 114, respectively.

The second switch includes terminal 127, which is connected to wiper 131 and M− motor terminal 104. Wiper 131 is also spring biased in a neutral position between terminals 123 and 123', which are connected, respectively, to B+ terminal 114 and B− terminal 113.

The third switch has a terminal 128 connected to wiper 132 and to B+ battery terminal 114. Wiper 132 is normally biased between terminals 124 and 125, both of which are connected to both CL1 clutch terminal 102 and BR1 brake terminal 101.

If momentary switch 13 is deflected upward, wipers 130, 131, and 132 electrically contact terminals 121, 123, and 124, respectively. This causes the CL1 and BR1 terminals to be energized, disengaging electromagnetic brake 75 and engaging clutch 69. Electromagnetic clutch 79 remains disengaged, and electromagnetic brake 83' remains engaged. The M+ and M− motor terminals are connected to the negative and positive battery terminals, respectively, causing the drive shaft of motor 67 to rotate in one direction.

If the momentary switch is lowered instead of raised, the CL1 terminal 102 and BR1 terminal 101 are nevertheless energized, disengaging brake 75 and engaging clutch 69, as before. However, the connection of the motor terminals M+ and M− motor terminals to the positive and negative battery terminals is now reversed, causing the direction of rotation of the drive shaft of motor 67 to be reversed.

If momentary switch 15 is deflected upward or downward, electromagnetic clutch 77 is energized, causing it to be engaged, and brake 83' is then energized, causing it to be disengaged. Motor 67 is energized and caused to rotate either clockwise or counterclockwise in the manner previously described.

A wide variety of reversible DC motors are commercially readily available. Similarly, electromagnetic clutches and electromagnetic brake assemblies are readily available and can be selected readily by those skilled in the art. A detailed description of these components of the invention is therefore not set forth herein.

In an alternate embodiment of the invention, DC motor 67, the associated electromagnetic clutches, electromagnetic brakes, pulleys, belts, the switching circuitry of FIG. 3, and the control panel of FIG. 4 are eliminated and replaced by a simple manual drive system including a pair of flexible cables connected by means of first and second bevel gear assemblies to rotating shafts 51 and 83, respectively. The first and second flexible cables are connected to first and second cranks or control knobs or handles, which are located near the seat of the tractor so that the driver can easily turn the cranks while seated in the tractor to extend or retract extension arms 1A and 1B and to adjust the inclination of pivot arms 17A and 17B.

Referring now to FIGS. 5, 9 and 12, crank 150 is mounted in mounting plate 151 (attached to the tractor near the driver's seat) by means of bearing 152, which is seated in mounting plate 151. Crank 150 is connected to flexible cable 146. Flexible cable 146 is extended along the hood of the tractor and is coupled by means of coupler 145 to rotating shaft 144. Shaft 144 is supported by bearing assembly 143 and is connected to bevel gear 142. Bevel gear 142 matches with bevel gear 141, which is attached to rotating shaft 51. Thus, when crank 150 is turned in the directions indicated by arrow 171, extension arms 1A and 1B are extended or retracted.

Similarly, crank 149 is mounted by means of bearing 153 and is connected flexbile cable 148. Flexible cable 148 is connected by means of coupler 147 to shaft 140. Shaft 140 is supported by means of bearing assembly 139 and is connected to bevel gear 138. Bevel gear 138 meshes with bevel gear 137. Bevel gear 137 is attached to rotating shaft 83. Thus, when crank 149 is turned in the directions indicated by arrow 172, pivot arms 17A and 17B are adjusted.

Figure 13:
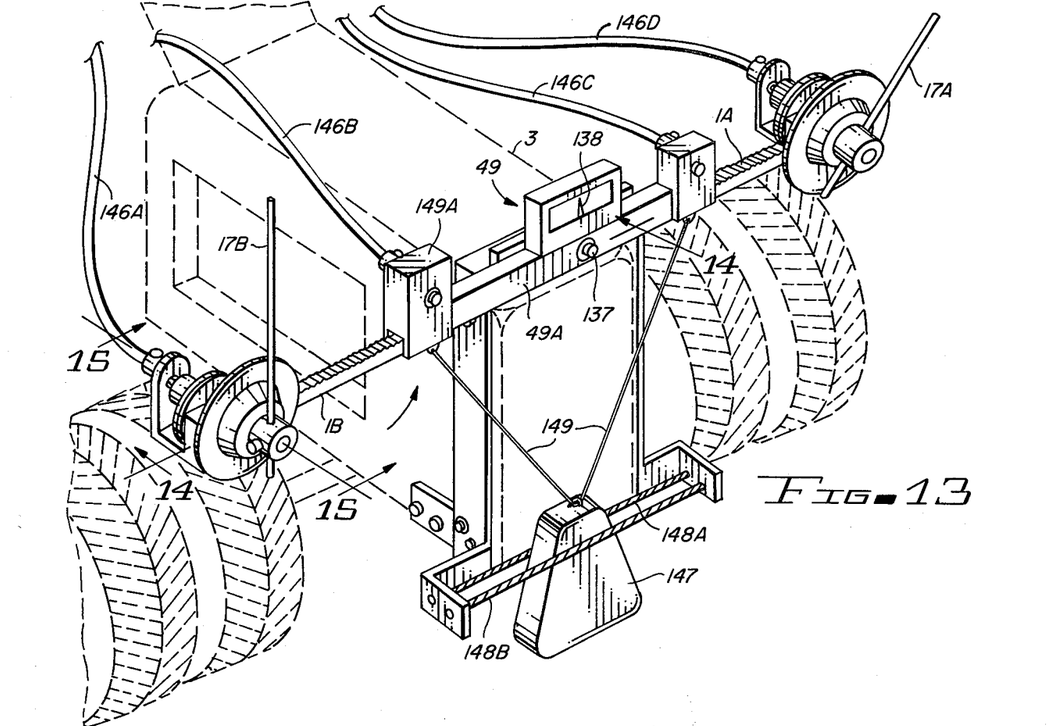
FIG. 13 is a partial isometric view illustrating another embodiment of the invention.
Figure 14:
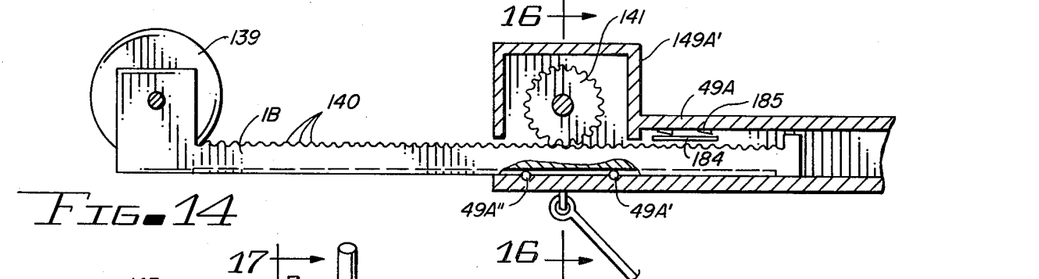
FIG. 14 is a partial section view taken along section line 14—14 of FIG. 13.
Figure 15:
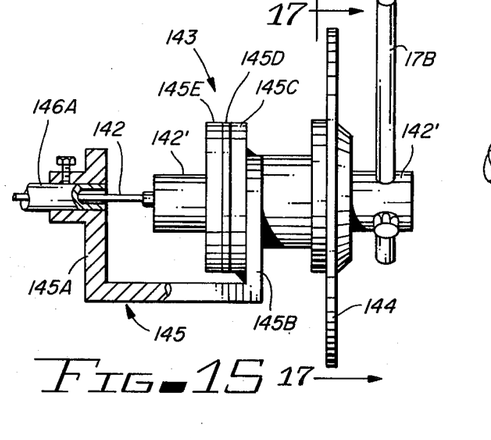
FIG. 15 is a partial section view taken along section line 15—15 of FIG. 13.
Figure 16:
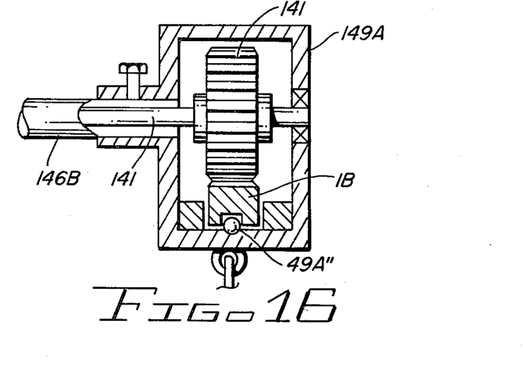
FIG. 16 is a partial cutaway section view taken along section line 16—16 of FIG. 14.

Another embodiment of the invention is shown in FIGS. 13–19. Where applicable, the same reference numerals are utilized as previously to identify similar or corresponding parts. Referring now to FIG. 13, sighting apparatus 1 includes a housing 49 pivotally mounted by means of pivot pin 137 on front end of tractor 3. Housing 49 includes a horizontal, hollow member 49A out of which horizontal extension arms 1A and 1B adjustably extend in a manner similar to that previously described. As best seen in FIGS. 14 and 16, horizontal extension arm 1B forms a gear rack having a plurality of gear teeth 140 that cooperate in conjunction with a pinion gear 141. Pinion gear 141 is housed in a housing section 149A' that extends upwardly from the upper surface of horizontal member 49A. Pinion gear 141 is coaxially attached to a center member 141' of a flexible cable 146B that extends rearward from housing 149A to a control panel 180, shown in FIG. 24. The driver of tractor 3 can turn crank 180A in order to cause pinion gear 141 to rotate either clockwise or counterclockwise, thereby moving horizontal extension arm 1B outward or inward relative to housing 49A. As best seen in FIGS. 14 and 16, a plurality of ball bearings such as 49A' and 49A'' ride in channels disposed in the lower surface of horizontal extension arm 1B and in the inner bottom surface of horizontal member 49A to effect lateral movement of horizontal extension arm 1B relative to horizontal member 49A.

It should be noted that a frictional "keeper" 184 is disposed between the upper portion of horizontal member 49A and the teeth 140 of horizontal extension arm 1B, as shown in FIG. 14. Friction keeper 184 can have a lower surface composed of any highly durable plastic material, such as Teflon, or the like. A plurality of compression springs such as 185 maintain a downward pressure of keeper plate 184 on teeth 140. Suitable adjustment means (not shown) are provided for adjusting the downward pressure on keeper plate 184. The purpose of keeper plate 184 is to provide a predetermined amount of resistance to lateral movement of horizontal extension arm 1B with reference to horizontal member 49A, so that as the tractor shifts and jolts as it moves over irregular ground, the amount of extension of horizontal extension arm 1B does not vary.

The structure and operation of horizontal extension arm 1A are essentially similar to that of horizontal extension 1B, and therefore will not be repeated.

In FIG. 13, a heavy weight 147 is suspended by means of cables 149 attached in symmetrical manner to the eyelets disposed on the opposite ends of horizontal member 49A. A retaining bracket 148 has a pair of taut cables 148A and 148B suspended therebetween on either side of the opposed major faces of pendalum weight 147. The tension of cables 148A and 148B has adjusted to produce a selected amount of frictional damping of the swinging lateral movement of pendulum weight 147. Thus, when tractor undergoes a sharp jolt or an abrupt tipping, horizontal member 49A remains relatively horizontal. The frictional damping provided on pendulum weight 147 dampens any oscillatory modulations of horizontal member 49A and the sighting rod 17A and 17B attached thereto, thereby enabling the driver of tractor 3 to keep sighting rod 17A and 17B more precisely aligned with the edge of the previously cut swath.

Figures 24, 25:
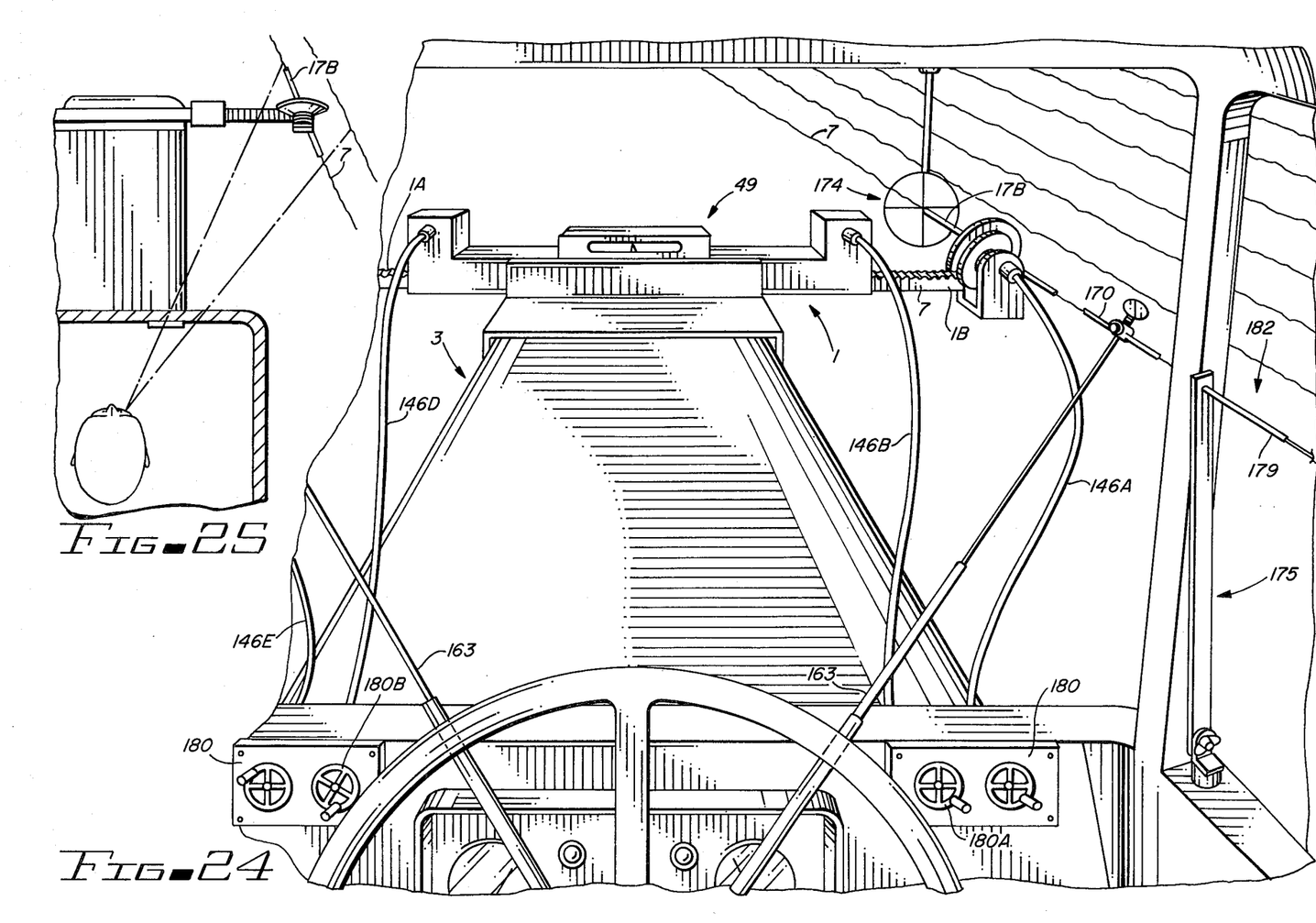
FIG. 24 is a perspective view from the driver's seat of the tractor of FIG. 1.
FIG. 25 is a top view illustrating the line of sight of a driver seated in the tractor of FIG. 25.

A pair of sighting rods 17A and 17B are pivotally mounted on the outer ends of horizontal extension arms 1A and 1B, respectively. Sighting rod 17A is rotated by means of a center member of flexible cable 146B. Cable 146B extends to a control crank 180B on control panel 180, as shown in FIG. 24. Similarly, sighting rod 17B is rotated by means of the center member of flexible cable 146A, which extends to control crank 180C on control panel 180. Thus, the driver of tractor 3 can, while seated in the driver's seat, adjust the orientation of sighting rods 17A and 17B and the extension of horizontal extension arms 1A and 1B.

Figures 17, 18, 19:
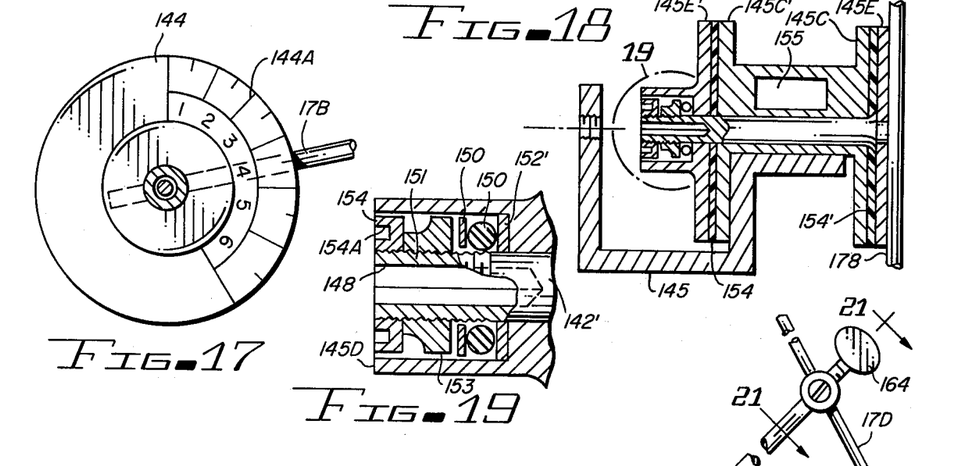
FIG. 17 is a section view taken along section line 17—17 of FIG. 15.
FIG. 18 is a section view of a detailed implementation of a clutch assembly of the alignment rods of FIG. 1.
FIG. 19 is an enlarged sectional view of detail 19 of FIG. 18.

According to the present invention, a friction clutch arrangement prevents sighting rods 17A and 17B from wobbling or oscillating due to the springiness of the center members of flexible cables 146A and 146B. To avoid such wobbling or oscillation, a friction brake arrangement is provided. One such friction brake arrangement is shown in FIG. 15, wherein bracket member 145 has two vertical portions 145A and 145B. A chuck for receiving and engaging the end of cable 146A is disposed in bracket member 145A. A stationary brake plate 145C is attached to the opposite vertical bracket member 145B. A Teflon disc 145D is disposed between stationary brake plate 145C and a rotatable brake plate 145E. Rotatable brake plate 145E is attached to axle member 142', which is rigidly attached to the end of the center member 142 of cable 146A. As cable center member 142 rotates, axle member 142' rotates. Rotatable brake plate 145E is rigidly attached to axle member 142' and therefore, rotates with it. Stationary brake plate 145C is rigidly attached to bracket 145, and therefore remains stationary. The pressure applied by brake plate 145C and 145E is adjusted to produce the desired frictional resistance to undesired wobbling or oscillation of sighting element 17B. It should be noted that the structure shown in FIG. 15 is presented mainly to schematically illustrate the application of the frictional concept. A practical implementation of this concept is shown in FIGS. 18 and 19. Referring now to FIGS. 18 and 19, wherein the end of center cable 142 of cable 146A extends through opening 147 of bracket 145 to engage the end of axle member 142'. Two friction brake plates 145E and 145E' are rigidly attached to axle member 142'. Sighting rod 17B is rigidly attached to rotatable brake plate 145E. Two stationary brake plates 145C and 145C' are rigidly attached to bracket 145. An annular flange 145D extends outwardly from brake plate 145E', forming a recess within which a flexible rubber O-ring 150 is disposed around axle member 142'. The left hand end of axle member 142' is threaded. Two washers 152 and 152' are disposed about axle member 142' on opposite sides of O-ring 150. A first nut 153 is threaded onto the threads of axle member 142', establishing pressure that tends to squeeze the respective brake plates together against Teflon discs 154 and 154'. A lock nut 154 is threaded onto the extreme end of axle member 142'. Recesses 154A accommodate a spanner wrench.

Referring now to FIG. 15 and 17, a stationary scale 144 having dark calibration lines 144A thereon is mounted in fixed relationship to bracket 145. The calibration lines enable the driver of the tractor to repeatably "calibrate" the settings of setting rods 17A and 17B.

Another embodiment of the invention is shown in FIGS. 20–23. Referring now to FIGS. 20–23, a sighting apparatus 1A that is suitable for mounting on the steering column 158 of tractor 3 immediately in front of the driver is shown. A pair of clamp members 159A and 159B are clamped together by means of a pair of bolts on steering column 158 of tractor 3 (the clamp members could be easily modified to effect attachment to the dashboard or other suitable point of tractor 3). Brackets 159A and 159B each include an upper outwardly inclined section, designated by reference numerals 160A and 160B. An adjustable bracket member 162 is attached to incline member 160B, as shown. Bracket 162 has a lower plate 162' and an upper plate 162" which support a pivot ball 173. Pivot ball 173 is rigidly attached to a telescoping arm 162. A sighting rod 17D is adjustably pivotally attached to the extreme upper end of telescoping arm 163.

Figure 20:
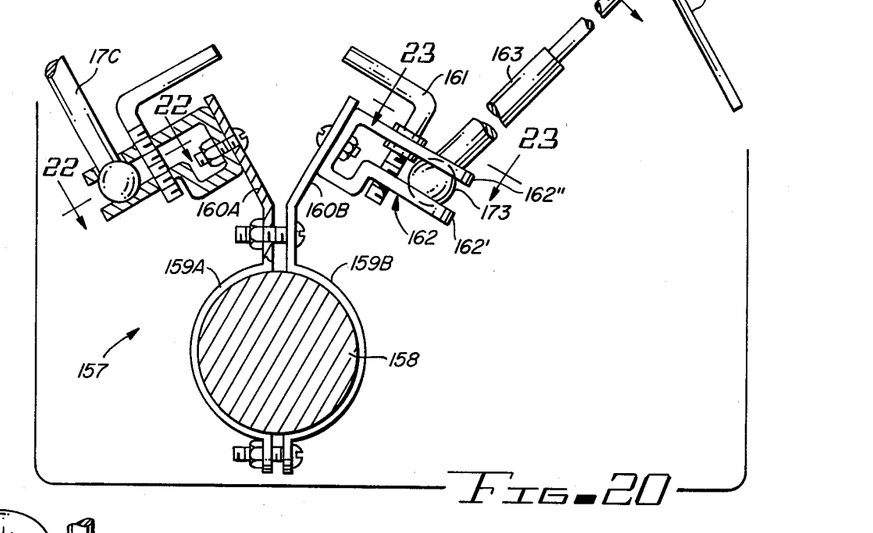
FIG. 20 is an end view of another embodiment of the invention.

Upper bracket plate 162" has a hole 172 therein. Hole 172 is smaller in diameter than the diameter of pivot ball 173 and has a surface which mates with pivot ball 172. Lower bracket member 162' has a semi-spherical recess 170 therein having the same radius of curvature as pivot ball 173, so that as telescoping arm 163 is swiveled relative to bracket 162, the surface of pivot ball 173 frictionally rotates in and is retained by semi-spherical recess 170 and the mating surface of hole 172. A friction adjusting level element 161 has a threaded end which extends through hole 171 of upper bracket plate 162" and engages threads of threaded hole 171' in lower bracket plate 162'. A pair of collars of lever element 161 produce counterfaces against upper bracket plate 162", thereby adjusting the forces applied by upper and lower bracket plates 161' and 162' on pivot ball 173, and thereby adjusting the friction between pivot ball 173 and upper and lower bracket plates 162" and 162'.

Figure 21:
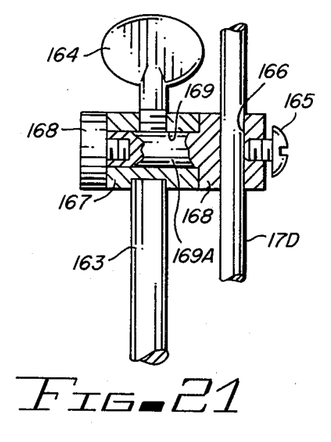
FIG. 21 is a partial sectional view taken along section line 21—21 of FIG. 20.
Figure 22:
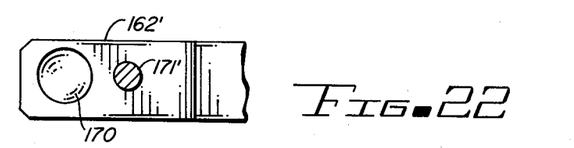
FIG. 22 is a partial section view taken along section line 22—22 of FIG. 20.
Figure 23:
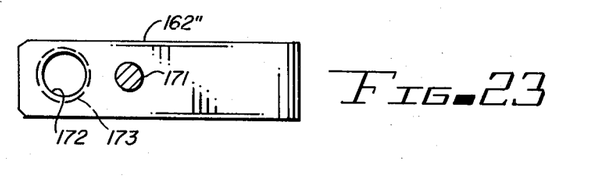
FIG. 23 is a partial section view taken along section line 23—23 of FIG. 20.

Referring now to FIG. 21, an outer bearing member 167 is rigidly attached to the extreme end of telescoping arm 163. An axial hole 169 extends through bearing member 167. An axle member 169A extends through hole 169. Shaft member 169A is rigidly attached to and integral with a block member 168. Block member 168 has a hole 166 perpendicular to hole 169. Sighting rod 17D extends slidably through hole 166. Screw 165 engages the threaded hole in the left end of shaft member 169A, retaining shaft member 169A in hole 169. By loosening set screw 165, the position of setting rod 17D can be selected by sliding citing rod 17D through hole 166. When the desired position is attained, sighting rod 17D is locked into that position by tightening set screw 165. When thumb screw 164 is loosened, sighting rod 17D can be rotated either clockwise or counterclockwise, relative to telescoping shaft 163. When the desired orientation is attained, sighting rod 17D is locked into that orientation by tightening thumb screw 164.

Utilization of sighting devices 1 and 1A shown in FIGS. 13 and 20, respectively, is best explained with reference to FIG. 24, which shows a respective view to the front windshield of tractor 3. Referring to FIG. 24, it is seen that sighting rod 17B, as seen through the eye of a driver seated in the driver's seat (not shown) of tractor 3, is perfectly aligned along edge 7 of the swath or furrow most recently cut by an implement towed by tractor 3.

A gunsight device 174 is rigidly and adjustably attached to a windshield frame member of tractor 3 for the purpose of allowing the driver to suitably align himself in the seat of tractor 3 to ensure accurate sighting with sighting rod 17B. Telescoping arm 163 of sighting apparatus 1A (FIG. 20) extends from the steering column 158 (FIG. 20) of tractor 3, as shown in FIG. 24. By adjusting the orientation of telescoping arm 163 and sighting rod 17D in the manner previously described, sighting rod 17D is also aligned along edge 7 of most recently cut swath. In some instances, sighting device 1A of FIG. 20 can be utilized alone, or as a substitute for the more extensive, and more expensive sighting apparatus 1.

FIG. 25 shows a top view illustrating visual alignment of sighting rod 17B with edge 7 of the most recently cut swath.

Figure 28:
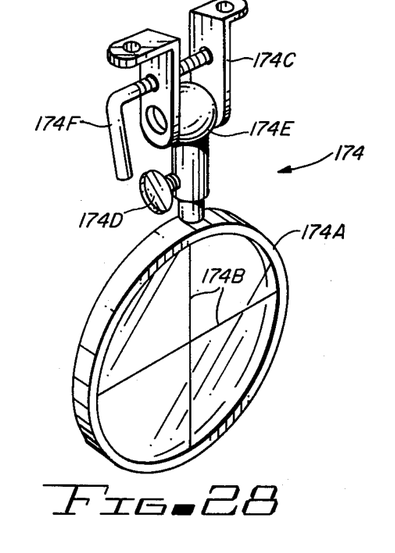
FIG. 28 is a sighting device shown in FIG. 24.

Referring now to FIG. 28, it is seen that gunsight element 174 includes a ring 174A having a pair of cross hairs 174B suspended therein. The vertical position of ring 174A is telescopically adjustable and is locked into a selected position by means of thumb screw 174D. A pivot ball 174E is retained between two support brackets 174C, the tension between the support element of bracket 174C and pivot ball 174E being adjusted by means of threaded adjusting element 174F.

Figure 26:
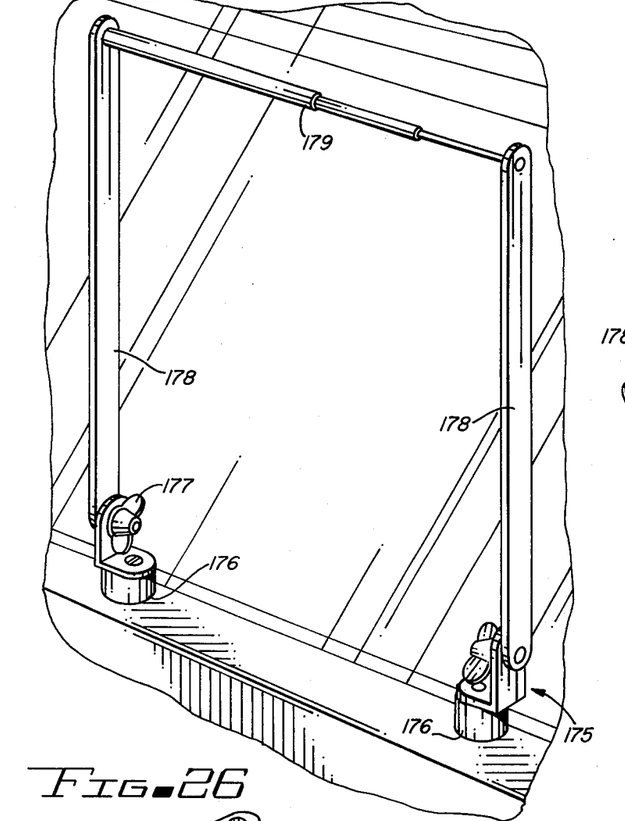
FIG. 26 is an isometric drawing of another embodiment of the invention.
Figure 27:
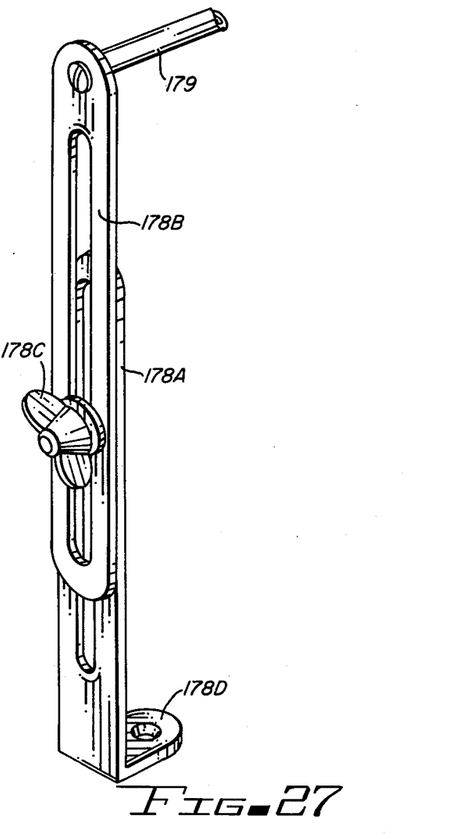
FIG. 27 is an isometric drawing of an alternate means of implementing a portion of the embodiment of FIG. 26.

Referring now to FIG. 26, another embodiment of the invention is shown for installation in any side window 182 of tractor 3 (FIG. 24). This device, designated by reference numeral 175, enables the driver of tractor 3 to judge the alignment of tractor 3 with edge 7 of the most recently cut swath as he looks out the side window of the tractor. Alignment element 175 has a pair of magnetic bases 176 which can be attached to any suitable point on the frame of tractor 3. Telescoping sighting rod 179 is connected to the upper ends of upright members 178. As shown in FIG. 27, upright members 178 can be implemented in a manner shown in FIG. 27, and can include two slotted members 178 and 178B drawn together at a selected adjustment by means of wing nut 178C.

It will be appreciated that as the driver of tractor 3 approaches the end of a row, the edge 7 of the previously cut swath may come to an abrupt end. It is in this situation that the telescoping sighting rod 179 of apparatus 175 and sighting rod 17D of apparatus 1A are especially useful, as sighting rod 17A and 17B of sighting apparatus 1 will appear to the driver to extend beyond the end of the previously cut swath.

It will be readily appreciated that where tractor 3 turns around at the end of each row, the relative settings of sighting rod 17A and 17B can be identical, and also the degree of lateral extension of each of horizontal extension arms 1A and 1B can be identical. However, after tractor 3 is cutting a circular pattern in the field, then, of course, only one of sighted rod 17A and 17B need be aligned with the previously cut swath.

While the invention has been described with reference to several embodiments thereof, those skilled in the art will be able to make various obvious modifications thereto without departing from the true spirit and scope of the present invention, as set forth in the appended claims.

I claim:

1. A sighting apparatus attachable to a tractor to enable a driver of the tractor to precisely align the tractor with swaths or furrows previously cut in a field by a farming implement towed to the tractor, said sighting apparatus comprising in combination:

a. a first extension arm for extending outwardly an adjustable distance to one side of the tractor from a mounting point of the tractor, said first extension arm having an outer end and an inner end;

b. support means pivotally connected to the mounting point and also engaging the inner end of said extension arm for supporting said first extension arm;

c. first adjustment means adjustable by a driver seated in the driver's seat of the tractor for controlling extending and retracting of said extension arm from said support means;

d. first sighting bar means rotatably connected to the outer end of said first extension arm for effecting visual alignment of the tractor with the previously cut swath or furrow;

e. second adjustment means adjustable by the driver when the driver is seated in the driver's seat of the tractor for controlling rotation of said first sighting bar means, said first and second adjustment means being located sufficiently close to the driver's seat to be conveniently controlled by the driver while the driver assumes a normal driving position in the driver's seat;

f. pendulum means connected to said support means for maintaining said support means in a level orientation as the tractor tilts or is jolted as the tractor moves over uneven or rough ground; and g. damping means engaging said pendulum means for damping movement of said pendulum means relative to the tractor.

2. The sighting apparatus of claim 1 further including a second extension arm for extending outwardly an adjustable distance to another side of the tractor from the mounting point, said support means supporting said second extension arm.

3. The sighting apparatus of claim 1 wherein said pendulum means includes a weight suspended beneath said support means, said weight being sufficiently heavy to cause said support means to maintain the level orientation although the tractor tilts.

4. The sighting apparatus of claim 3 wherein said damping means includes a first taut cord frictionally engaging said weight and means connected to the tractor for supporting said first cord and maintaining said first cord taut.

5. The sighting apparatus of claim 4 wherein said damping means includes a second cord tautly supported by said cord supporting means for frictionally engaging one side of said weight.

6. The sighting apparatus of claim 1 wherein said first extension arm includes a rack gear, and said support means supports a pinion gear for engaging the teeth of said rack gear, said pinion gear being included in said first adjustment means.

7. The sighting apparatus of claim 6 wherein said first adjustment means includes a cable means connected to said pinion gear for effecting turning of said pinion gear and a control actuatable by a driver seated in the driver's seat for turning a center element of said cable means.

8. A sighting apparatus attachable to a tractor to enable a driver of the tractor to precisely align the tractor with swaths or furrows previously cut in a field by a farming implement towed by the tractor, said sighting apparatus comprising in combination:

a. a first telescoping extension rod for extending outwardly an adjustable distance from a mounting point of the tractor in front of the driver, said first extension rod having first and second ends;

b. mounting bracket means attachable to said mounting point for pivotally supporting the first end of said first telescoping extension rod, said mounting bracket means causing resistance to pivoting of said first telescoping extension rod in order to allow manual movement of said first telescoping extension rod to a selected orientation and causing said first telescoping extension rod to maintain that orientation; and c. first sighting bar means pivotally connected to the second end of said first telescoping extension rod for alignment with two points which lie along an edge of the previously cut swath or furrow to effect visual alignment of the tractor with the previously cut swath or furrow; and d. pivotal connecting means for pivotally connecting said first sighting bar means to the second end of said first telescoping extension arm, said pivotal connecting means causing resistance to movement of said first sighting bar means relative to said first telescoping extension arm.

9. The sighting apparatus of claim 8 further including a second telescoping extension arm.

10. The sighting apparatus of claim 8 wherein said mounting bracket means includes means for effecting rigid attachment of said sighting apparatus to a steering column of the tractor.

11. The sighting apparatus of claim 9 wherein said first telescoping extension rod is manually extendable to adjust the extension of the second end from the mounting point.

12. The sighting apparatus of claim 11 including a pivot ball attached to said first end, said mounting bracket means frictionally engaging said pivot ball to cause said resistance.

13. A sighting apparatus attachable to a tractor to enable the driver of the tractor to precisely align the tractor with swaths or furrows previously cut in a field by a towed farming implement, said sighting apparatus comprising in combination:

(a) a first extension arm for extending outwardly a variable distance from a first point of the tractor on which said sighting apparatus is attached, said first extension arm having first and second ends;

(b) mounting means pivotably connected to a mounting point of the tractor for supporting said first extension arm;

(c) first sighting means connected to the second end of said first extension arm for effecting visual checking of alignment of the tractor with an edge of said previously cut swath or furrow to determine whether said first sighting means lies along a straight line between an eye of the driver and the edge of the previously cut swath or furrow, said first sighting means including a sighting blade pivotably connected to the second end of said first extension arm, said sighting blade having a blade edge for simultaneous alignment with both the eye of the driver and two substantially spaced points on the edge of said previously cut swath or furrow;

(d) first means coupled to said first extension arm for controlling the variable distance through which said first extension arm extends, a portion of said first means being located sufficiently close to a driver's seat of the tractor to enable the driver to operate said first means while the driver is in a normal driving position;

(e) second means coupled to said first sighting means for effecting pivoting of said sighting blade to precisely align two spaced points on said blade edge with the eye of the driver and respective ones of both of said substantially spaced points on the edge of said previously cut swath or furrow;
(f) pendulum means connected to said support means for maintaining said support means in a level orientation as the tractor tilts or is jolted as it moves over uneven or rough ground; and
(g) damping means engaging said pendulum means for damping movement of said pendulum means relative to the tractor.

14. The sighting apparatus of claim 13 further including second sighting means disposed closer to the driver of the tractor than said first sighting means for effecting visual checking of alignment of the tractor with nearby portions of said edge of said previously cut swath or furrow, said second sighting means including third means aligned in linear relationship with said sighting blade, said third means having an edge for simultaneous alignment with both the eye of the driver and two other nearer, substantially spaced points on said edge of said previously cut swath or furrow, said sighting apparatus further including fourth means for aligning said third means in linear relationship with said sighting blade of said first sighting means.

* * * * *